United States Patent
Thomas

(10) Patent No.: US 8,652,555 B2
(45) Date of Patent: Feb. 18, 2014

(54) DISTILLER GRAIN PELLET PRODUCTION METHODS

(71) Applicant: Michael R. Thomas, St. Clair, MO (US)

(72) Inventor: Michael R. Thomas, St. Clair, MO (US)

(*) Notice: Subject to any disclaimer, the term of this patent is extended or adjusted under 35 U.S.C. 154(b) by 0 days.

(21) Appl. No.: 13/652,393

(22) Filed: Oct. 15, 2012

(65) Prior Publication Data
US 2013/0040023 A1    Feb. 14, 2013

Related U.S. Application Data

(63) Continuation of application No. 13/448,358, filed on Apr. 16, 2012, now Pat. No. 8,287,268.

(60) Provisional application No. 61/476,224, filed on Apr. 15, 2011.

(51) Int. Cl.
*A21C 3/04*    (2006.01)
*B29C 47/78*    (2006.01)

(52) U.S. Cl.
USPC ............. 426/516; 426/54; 426/443; 426/448; 426/454; 426/468; 425/382.4; 425/378.1; 425/144

(58) Field of Classification Search
USPC ............. 426/516, 517, 53, 54, 443, 445, 447, 426/448, 468, 623, 624, 635, 454; 425/72.1, 72.2, 143, 144, 149, 207, 425/208, 209, 308, 309, 325, 378.1, 382.4, 425/404, 464
See application file for complete search history.

(56) References Cited

U.S. PATENT DOCUMENTS

| | | | |
|---|---|---|---|
| 3,868,469 A | 2/1975 | Chalin | |
| 3,904,769 A | 9/1975 | Sair et al. | |
| 3,970,761 A | 7/1976 | Wenger et al. | |
| 4,042,715 A | 8/1977 | Wenger et al. | |
| 4,185,123 A | 1/1980 | Wenger et al. | |
| 4,372,734 A | 2/1983 | Dolan et al. | |
| 4,423,082 A | 12/1983 | Bauernfeind et al. | |
| 4,882,105 A | 11/1989 | Volk, Jr. | |
| 5,242,292 A | 9/1993 | Wenger | |
| 5,413,475 A * | 5/1995 | Murata et al. | 425/205 |
| 5,525,050 A | 6/1996 | Takizawa et al. | |
| 5,558,886 A | 9/1996 | Martinez-Bustos et al. | |
| 5,643,618 A | 7/1997 | Huberg et al. | |
| 5,776,534 A | 7/1998 | Christensen et al. | |
| 5,919,509 A | 7/1999 | Cremers et al. | |
| 6,277,425 B1 | 8/2001 | Nash et al. | |
| 6,403,138 B1 | 6/2002 | Arora | |
| 7,097,873 B2 | 8/2006 | Asensio et al. | |
| 7,347,965 B2 | 3/2008 | Klaus | |
| 7,695,747 B2 | 4/2010 | Meier | |
| 8,067,047 B2 * | 11/2011 | Fajt et al. | 426/285 |
| 8,118,582 B1 | 2/2012 | Ileleji et al. | |
| 2008/0290548 A1 | 11/2008 | Landers | |
| 2009/0238920 A1 | 9/2009 | Lewis | |
| 2009/0304835 A1 | 12/2009 | Savich et al. | |
| 2010/0074981 A1 | 3/2010 | Morales-Alvarez et al. | |

* cited by examiner

*Primary Examiner* — Seyed Masoud Malekzadeh
(74) *Attorney, Agent, or Firm* — Doster Greene, LLC

(57) ABSTRACT

A method for producing a high density compact livestock feed from a loose granular material may include feeding distiller grain into a loading zone and passing the distiller grain into a heating zoned comprising one or more heaters and a rotating screw. The method further includes rotating the screw to transfer the treated material through the heating zone while increasing the compressive force applied to the treated material. The method may further include pressing the treated material through a compression enclosure that simultaneously applies a transverse force and a parallel force onto the treated material to form a high density compact body. The method may then include a cooling process and an extraction process.

9 Claims, 9 Drawing Sheets

DISTILLER GRAIN PELLET PRODUCTION METHODS

REFERENCE TO RELATED APPLICATION

This application is a continuation of U.S. application Ser. No. 13/448,358, filed Apr. 16, 2012, and now U.S. Pat. No. 8,287,268, which claims priority of U.S. Provisional Patent Application Ser. No. 61/476,224, which was filed on Apr. 15, 2011. The subject matter of the earlier filed applications is hereby incorporated by reference.

FIELD OF THE INVENTION

This invention relates to an apparatus and method for treating granular material such as dry distiller grains (DDG) for the purpose of transforming the granular loose material into a dense cohesive bulk product and optionally extracting and collecting liquids and vapors from the bulk material as a separate product.

BACKGROUND OF THE INVENTION

In the field of animal feed processing, wet and dried distiller grains are a major feed source for farm livestock. This is due in part to the increased commercial interest in ethanol production. Wet distiller grains are one of the residual products of grain fermentation that forms during the production of ethanol. This residue, which is sometimes called mash, has relatively high water content in the range of about 60-70% and has a high nutritional value, which is a good supplemental food source for livestock.

However, one of the major problems with wet distiller grains is that it is susceptible to mold and mildew when exposed to air for about 4 to 5 days. This potential mold and mildew issue makes it imperative that the wet grains are used and consumed relatively quickly, because extended storage of wet grains is not feasible. To address the mold and mildew issues with wet grains, oftentimes, a drying process is applied to the wet grains prior to their delivery as livestock feed. Typically, the wet grains are treated in rotating drying drums where combustion gases are heated to approximately 900 degrees Fahrenheit and then injected into the wet grains to evaporate the excess moisture. At the conclusion of the drying process, the wet grains are transformed into dried distiller grains having moisture content in the range of 10 to 15% water. The dried grains are a more desirable livestock feed in that they are not as susceptible to mold or mildew given their lower water content. Dried grains therefore have longer storage life. The dried grains have an added benefit in that they are more concentrated and therefore contain more nutritional value per unit volume than wet grains.

While dried grains have several advantages over wet grains, they do have some properties that make them less than desirable as a livestock feed. First, the dried grains have a loose and granular consistency which makes them susceptible to dilution and spoilage when spread on the ground as feed and exposed to the weather. In this loose granular form, the livestock consuming the dried grains do not receive the full potential benefit of the nutritional value of the feed, because of the relatively low density of the material. Second, transportation of loose granular material such as dried grains also presents material handling issues when compared to more dense bulk material. Another serious concern with dried grains is the safety of the drying process that transforms wet grains to dried grains. Given that the drying process generally takes place in a rotating drum with an open boundary between the grain and the heated combustion gases, there is a constant danger of potential explosions within the volatile atmosphere inside the drying drum. This problem can be a major safety hazard for personnel operating the dryers and it can cause down time and increased capital cost.

To address the low density concerns associated with the loose granular dried grains, pelletizing of dried grains has been implemented by many livestock feed manufacturers. In some conventional methods, the pellets or range cubes are formed by compressing dried grains with the addition of binder materials or supplements that help the resulting pellet become dense and cohesive. While this solution is an improvement over the loose granular dried grains, the addition of supplements to the dried grains results in an increase in cost and lowers the nutritional value per unit volume of the final product in comparison to a dried grain pellet produced without such binders and supplements. One of the main problems with the pellets and cubes produced from this conventional technique is that they are made with binders and fillers, to keep them together. Even with these additives, the pellets and cubes can fall apart. Thus, it may be desirable to produce a cube or pellet having the highest protein and fat content, as naturally possible. A system and method is needed that produces a sufficiently dense pellet having the highest fat and protein content, without adding any binders, which are non-natural additives like molasses.

Some of the conventional pellet producing methods require a heating or curing process applied to the pellet or cube after it is formed in order to boil off the corn oil, which also lowers the protein level. Thus, there is a need to provide a method that does not require a heating or curing process after the pellet or cube is produced.

After the pellet is made, it must be transported from the manufacturing facility to the farmer. Typically, during transport, the product is subjected to several intermediate transfers using an auger. The cattle feed industry currently produces cube and pellets that cannot be augured several times. Even with the increase in product density, the resulting product that includes binders and supplements does not have sufficient density and cohesiveness to maintain their structural integrity when subjected to the repeated stress of being augured several times during transport. This repeated stress can cause the product to break apart or become damaged. Thus, there is a need to produce a product that is capable of being purchased in bulk, being transported via rail car or semi-trailer load, being augured several times during transport, and, upon arrival at its destination, being augured by the existing feeding system that the cattle farmer already has installed.

SUMMARY OF THE INVENTION

The present invention may satisfy one or more of the above-mentioned desirable features. Other features and/or aspects may become apparent from the description which follows.

It is the object of the invention to provide a livestock feed material in the form of distiller dried grains without the addition of additives and/or supplements by producing a pelletized livestock product that has high shipping durability, high quality, and high nutritional value. Thus, the final product provides optimum nutritional value in a very compact and efficient form.

It is another object of the invention to extract and collect grain oils and moisture from the distiller dried grains during the production of pelletized distiller grain product.

It is another object of the invention to pass the distiller dried grain through a die that applies a cross-sectional compression. For example, some embodiments are directed towards a die that simultaneously applies a two-dimension cross-sectional and lateral pressure at about 180 degrees Fahrenheit, wherein the product exits the die 140 degrees.

It is a further object of the invention to produce, from distiller grain, a product such as a pellet or cube, which is sufficiently dense to endure being augured several times during transport without breaking apart and becoming damaged. The density of the pellets or cubes is manipulated and controlled during the production process such it prevents the final product from crumbling or falling apart.

It is another object of the invention to provide a high-protein and fat product, without additives, that can be spread onto the ground as livestock feed and is capable of enduring various weather conditions.

It is another object of the invention to provide a method, which does not require heating or curing of the pellets after the pellets are produced.

It is another object of the invention to take an initial by-product of an ethanol production or a corn by-product and produce a dried distiller grain product capable of being consumed by livestock.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

The skilled artisan will understand that the drawings described below are for illustrative purposes only. The drawings are not intended to limit the scope of the present teachings in any way.

DESCRIPTION OF THE EMBODIMENTS

Figure 1A:
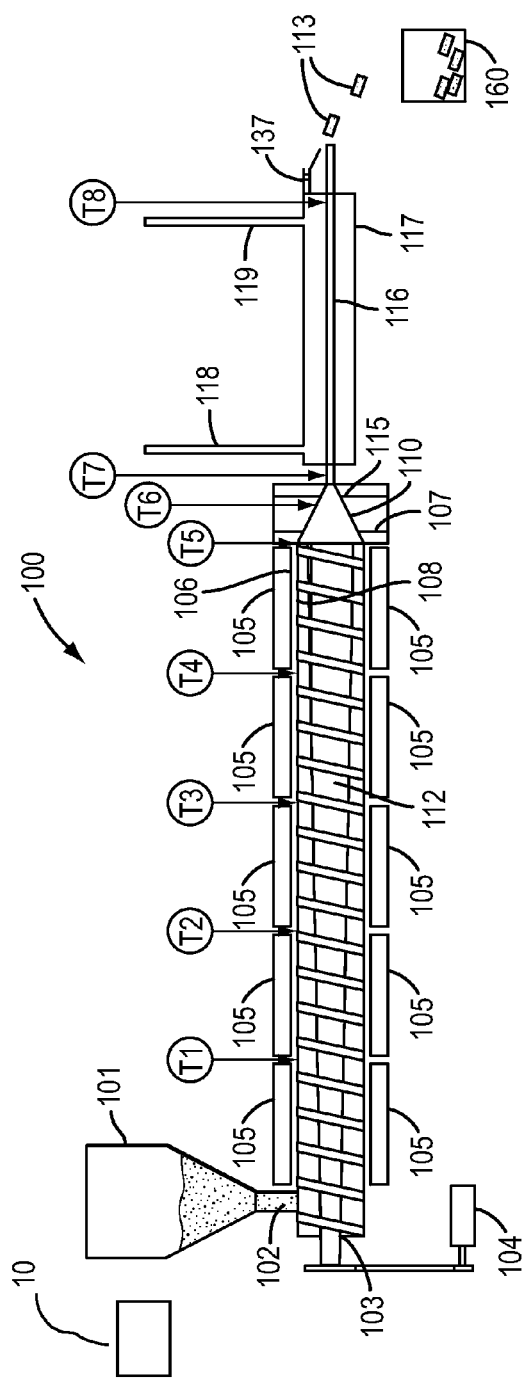
FIG. 1A shows a general schematic drawing of an exemplary embodiment of a system for producing a distiller grain pellet in accordance with the present teachings.

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application.

Unless otherwise indicated, all numbers expressing quantities, percentages or proportions, and other numerical values used in the specification and claims, are to be understood as being modified in all instances by the term "about" or "approximately." Accordingly, unless indicated to the contrary, the numerical parameters set forth in the following specification and attached claims are approximations that may vary depending upon the desired properties sought to be obtained. In some instances, "about" or "approximately" can be understood to mean a given value ±5%. Therefore, for example, about 100 degrees Fahrenheit could mean 95-105 degrees Fahrenheit.

Various embodiments of the distiller grain pellet producing devices described herein enable pellet production without the addition of binders and fillers to avoid negatively affecting the nutritional value of the final product. Various embodiments of the distiller grain pellet producing devices produces a livestock feed material in the form of pelletized distiller dried grains having high shipping durability, high quality, and high nutritional value. The final product provides optimum nutritional value in a very compact and efficient form. Various embodiments extract and collect grain oils and moisture from the distiller dried grains during the production process. Various embodiments of the pellet producing device pass the distiller dried grain through a die that applies a cross-sectional compression, while controlling the density of the product. Various embodiments of the pellet producing device in various structural forms, for example, in the form of pellets, cubes, or tubs having various configurations such as round, square, rectangular or oblong.

Various embodiments of the pellet producing device provides a high-protein and fat content product, without additives, that can be spread onto the ground as livestock feed and is capable of enduring various weather conditions. Various embodiments provide a method that does not require heating or curing of the pellets after the pellets are produced. Various embodiments of the pellet producing device take an initial by-product of an ethanol production or a corn by-product and produce a dried distiller grain product capable of being consumed by livestock.

FIG. 1A shows a schematic diagram of a distiller grain (DG) pellet production device 100 which can be used to process dried distiller grains into pelletized distiller grain product. The pellet production device 100 can include a loading zone, which may include a hopper 101, a heating zone, which may include heaters 105, a compression zone, which may include a compression enclosure 110, and a cooling zone, which may include a heat exchanger 117. The device 100 can include a loading zone for loading the distiller dried grains into the heating zone. Distiller dried grains supplied from hopper 101 in loose granular form can be feed into the heating zone at an inlet chute 102 of a profile screw extruder 112 shown in FIGS. 1A and 2. T A variable speed motor 104 connects to the screw of the extruder and drives the screw element 103 of the profile screw extruder.

Figure 2:
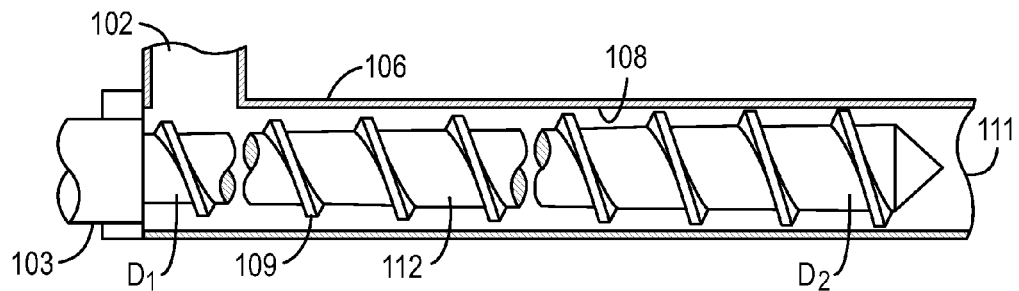
FIG. 2 shows an example of a profile screw used to compress and transport the distiller dried grains through the production line.

The distiller dried grains entering the profile screw extruder at inlet chute 102 can have a moisture content in the range of about 10-15% by weight. As the distiller dried grain is conveyed and compressed within the profile screw extruder 112, heat is added to the distiller dried grain by heaters 105 positioned along the wall 106 of the profile screw extruder. FIG. 2 shows a general shape of the profile screw 112 where the shaft diameter increases from $d_1$ to $d_2$ along the length of the screw which creates an increasing compression force on the treated material being conveyed downward due to the rotation of the screw. The heaters 105 can be arranged along the profile screw 112 in heating zones where the individual heaters can be equipped with independent heater controls for creating separate heating zones where selected temperatures are maintained in the treated distiller grain as it is conveyed and compressed in the profile extruder 112. The type of heater devices employed for heating the treated material can include but are not limited to electric heaters, combustion gas heaters, microwave heaters, solar powered heaters or any combination of these or any other suitable heating devices.

A series of temperature sensors, for example, T1, T2, T3, T4 and T5, may be embedded within the wall 106 of the profile screw extruder. These temperature sensors can be used to monitor the temperature of the treated material so that appropriate adjustments to the heater output, distiller dried grain feeding rate, and profile screw rotation rate are regulated to maintain the treated material within a desired temperature range along the treatment zones of the profile screw extruder 112. While five temperature sensors are shown, it should be understood that there may be more temperature sensors or less temperature sensors depending on the material treated, the length of the profile screw extruder and the desired precision of temperature monitoring within the heating and compression treatment zone. It should be noted that the temperature sensors may be connected in a computer control loop where the individual heater output regulators, a profile screw extruder motor speed regulator, and a distiller grain feed flow controller may all be individually controlled to maintain preselected temperature conditions in the treated distiller grain as it travels along the profile screw extruder 112.

In some embodiments, the heating zone may include a plurality of adjacent treatment zones. In some embodiments, the heating zone may include adjacent treatment zones where no heat is applied to the treated material. In other embodiments, the heating zone may consist of a single treatment zone. Control of the motor 4 regulates the residence time of the treated material in the treatment zones.

Figure 3:
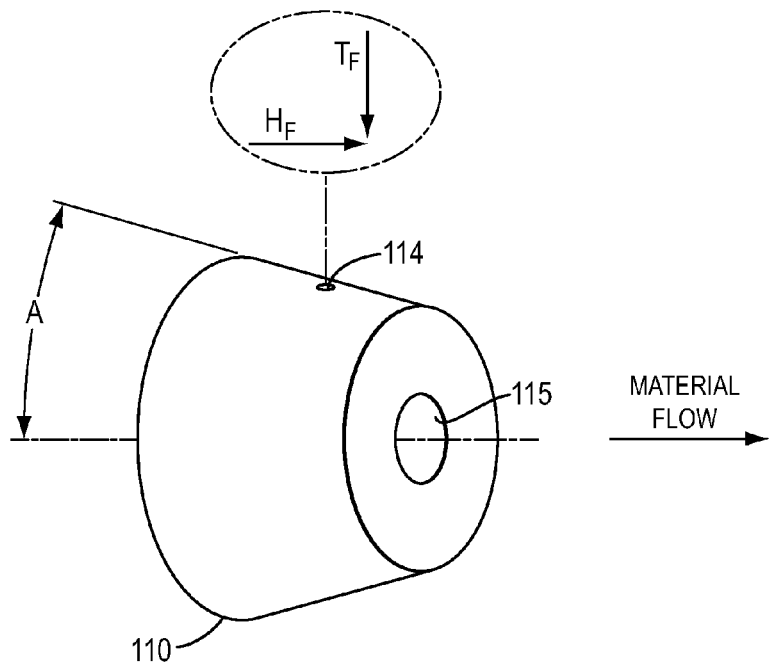
FIG. 3 shows a perspective view of a conical shaped compression enclosure positioned between a first and second die where the distiller dried grains are simultaneously compressed parallel to the horizontal axis of transport and then compressed transverse to the horizontal axis of transport.

FIG. 3 shows a conical shaped compression enclosure 110 in the compression zone in which the heated distiller grain enters as it exits from an outlet 111 of profile screw extruder 112 the heating zone. Initially, the distiller grain is forced through a first die 107 located at the entrance of a conical compression enclosure 110 by the pressure applied to the treated material due to the rotation of the profile extruder 112. This first die 107 generally has a cross section area that is less than the cross sectional area defined by the circumference of the inside wall 108 of the outlet 111 of the profile extruder shown in FIG. 2. The conical section compression enclosure 110 performs a critical function in the process to form the treated distiller grain. Given that compression enclosure 110, in this example, has a conical shape, the treated distiller dried grain is compressed parallel to its axis of transport and it is also compressed in a direction transverse to the direction of transport. A simulated free body diagram of the compressive forces on the treated material at location 114 inside the enclosure is shown in FIG. 3 where $T_F$ represents the transverse compression force and $H_F$ represents the force acting parallel to the axis of material transport. This transverse compression $T_F$ of the treated distiller dried grain strengthens the outer surface of the treated distiller grain which results in a more durable final product. The amount of transverse compression $T_F$ that is applied to the distiller dried grain in compression enclosure 110 depends on the pressure applied by the profile extruder 112, the length of enclosure 110 and the angle of inclination A of the conical surface walls. These parameters can be selected to design a specific compression enclosure 110 to obtain a desired outer surface durability of the final product and the type of material that is being treated.

Compression enclosure 110 can have a variety of configurations (e.g., size, shape, etc.) such that, for example, passing a treated material through the enclosure 110 generates sufficient compressive forces on the treated material to form a dense cohesive elastic material. In various embodiments, the production device 100 can be designed to be material specific such that the configuration of the compression enclosure 110 (e.g., the configuration of one or more die through holes) can be selected based upon the compression rate required for the treated material selected for pelletizing. Ideally, the transverse compression force $T_F$ and the parallel force $H_F$ are approximately equal for most, but not all applications. Several sensors can be employed to assist in monitoring the condition of the distiller grain as it passes through the compression enclosure 110 . . . . For example, using temperature sensor T5, the temperature of the treated distiller grain can be measured prior to entering the first die 107. A further distiller dried grain temperature reading can be measured between the first die 107 and the second die 115 by temperature sensor T7. Another temperature reading can be taken at temperature sensor T8 to measure the temperature of the treated distiller grain after it passes the second die 115 and exits the die extremity tube 116.

Subjecting the distiller grain to the combined effects of heating from about 180-200 F and compression in the range of 2 k to 10 k psi at the second die position 115 causes a mixture of liquid and vapor from the water and oils contained in the distiller grain to begin to boil and migrate to the outer surfaces of the treated distiller grain as it reaches the outlet 111 of the compression enclosure 110 at the second die orifice 115. During this heating and compression, the distiller dried grain is transformed from a loose granular material into a dense cohesive elastic material where the mixture of heated liquid and vapor from the oil and water in the distiller grain collects on the outer surfaces of the treated distiller grain to form a lubrication layer. It is important to note that this oil and water mixture is not discharged or vented to the atmosphere but instead it begins to collect on the inner wall of the compression enclosure 110 near the second die orifice 115. The oil and moisture liberated from the distiller grain at this point in the process provides lubrication for the treated distiller grain all the way to the discharge of the pelletized/agglomerated product 113. Another benefit derived from the extended heating that occurs at this stage is the sterilization of the treated distiller grain material.

Figure 4:
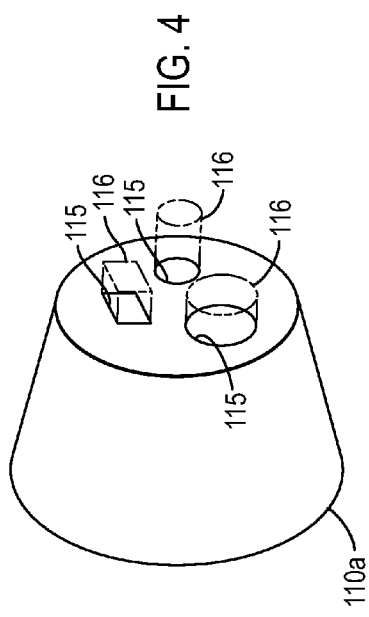
FIG. 4 shows an alternative embodiment of FIG. 3 where the conical shaped enclosure feeds multiple extrusion die extremity tubes.
Figure 5:
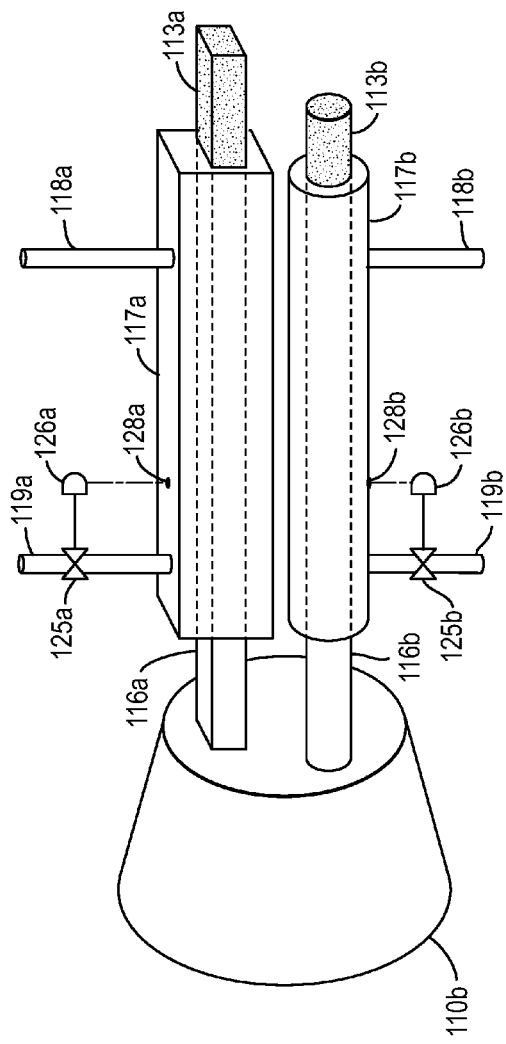
FIG. 5 shows a compression enclosure where multiple distiller grain die extremities have separately adjustable cooling heat exchangers for the individual die extremities.

After undergoing the compression treatment in the compression enclosure 110 at the second die orifice 115, the treated distiller grain is in a relatively modulus state and is directed into a die extremity tube 116. The modulus state of the treated material enables it to easily deform elastically and conform to the shape of the die extremity tube 116. The diameter and shape of the die extremity tube 116 can be selected according to the desired shape and size of the final product. In some embodiments, the compression enclosure 110 may include a plurality of die extremity tubes 116, as shown in FIGS. 4 and 5. For example, the die extremity tubes 116 may have a cross section opening that will produce a round, square, rectangular or oblong shape to name just a few of the possible configurations. FIG. 4 shows a modified compression enclosure 110a with multiple die openings 115. FIG. 5 shows different die extremity tubes 116 having different diameter and shape extending from the modified compression enclosure 110b. Some examples of the different kinds of cross sections may include round, square, rectangular, star shaped, triangular etc. It should be understood that the cross-sections of the die extremity tubes 116 depicted in the figures are exemplary only and those having ordinary skill in the art would appreciate that a variety of geometric structures having differing configurations and numbers may be substituted for or used in conjunction with the die extremity tubes 116. The plurality of die extremity tubes 116 may include geometric structures of the same or differing configurations.

Figure 1B:
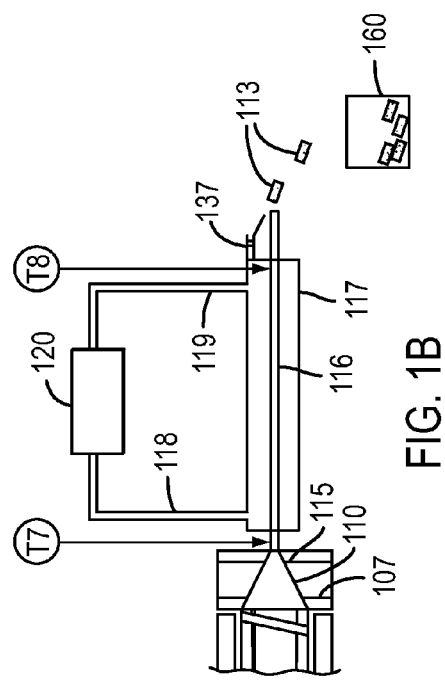
FIG. 1B shows another exemplary embodiment of a system for producing a distiller grain pellet in accordance with the present teachings; medium.

As the treated distiller grain is pushed through the die extremity tubes 116, the distiller grain may be cooled in a heat exchanger assembly 117. In FIG. 1A, the heat exchanger assembly may use water as its cooling agent and the cooling water enters or exits the heat exchanger 117 by way of pipes 118 and 119. Either of pipes 118 or 119 can be used as the entry point or exit point of the cooling water depending on the type of flow that is desired in the heat exchanger. In FIG. 1B the heat exchanger 117 is cooled by a cooling medium processing device 120. The cooling medium processor 120 can be in the form of any known cooling system. A partial listing of cooling devices and methods that may be used would include cryogenic coolers, refrigerated air heat exchangers, water chillers, cooling towers and any other known cooling device or combination of cooling devices that are capable of cooling the treated distiller grain to a stable internal temperature before it is discharges as a final product. Another exemplary cooling system for multiple die extremity tubes is shown in FIG. 5. In this arrangement two different shaped die extremity tubes 116a and 116b are cooled in heat exchangers 117a and 117b. The control of the flow of the coolant to the heat exchangers 117a, 117b is regulated by control valves 125a and 125b. Valve control regulators 126a and 126b can be set to maintain different cooling rates in heat exchangers 117a and 117b. The valve control regulators 126a and 126b could also be functionally connected to temperature sensors 128a and 128b located in the heat exchangers 117a or 117b or in the die extremity tubes 116a or 116b to control the flow of coolant through valves 125a and 125b to maintain a desired temperature in the heat exchanger, the die extremity tubes or treated distiller grain.

Figure 6:
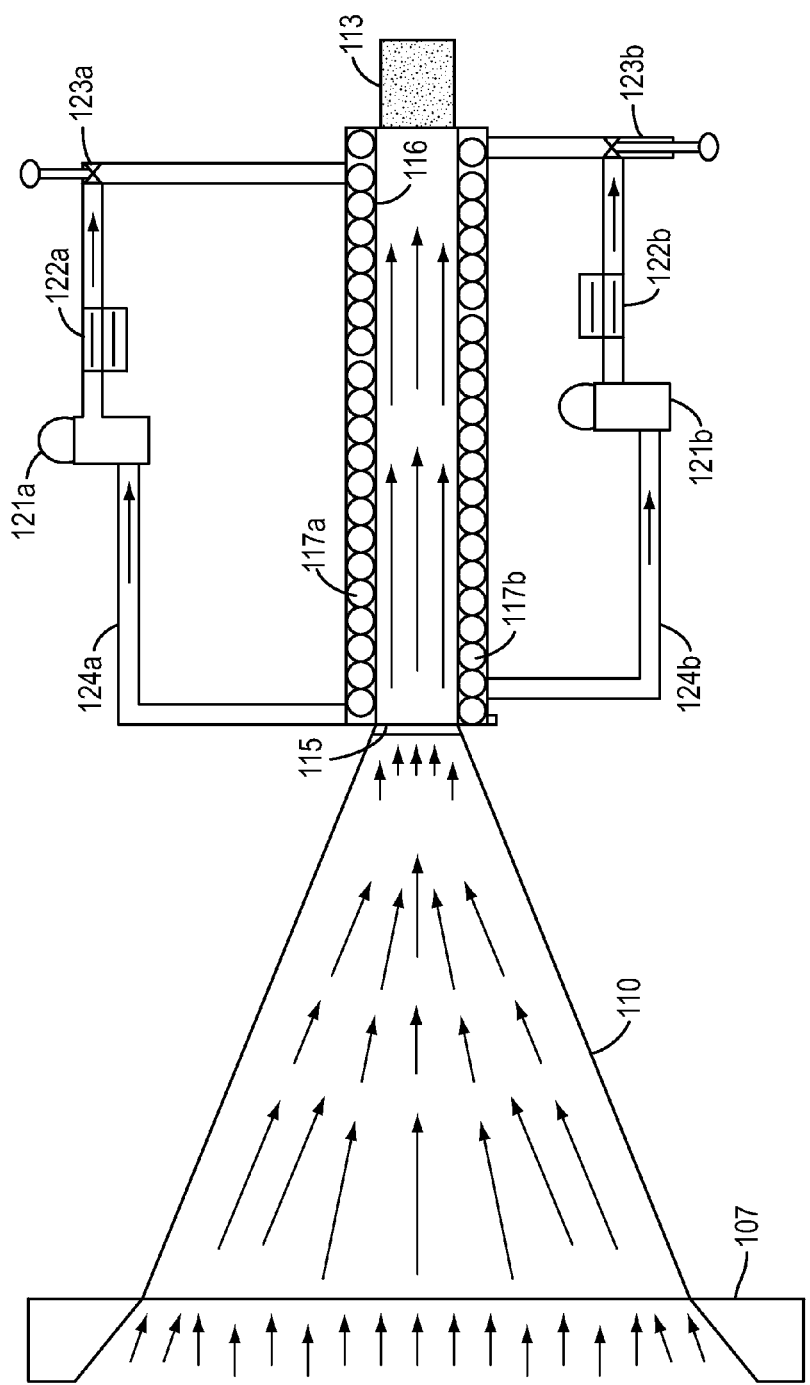
FIG. 6 shows a heat exchanger arrangement using a compression refrigeration system to cool the extruded distiller grain feed in the die extremity.

Another exemplary embodiment of a cooling arrangement is shown in FIG. 6. In this arrangement, two vapor compression refrigeration systems are used to cool the treated distiller grain in the die extremity tubes. Refrigeration compressors 121a and 121b direct compressed refrigerant vapor to condensers 122a and 122b. The condensed refrigerant is than passed through expansion valves 123a and 123b where low pressure cool refrigerant is then passed into heat exchangers coils 117a and 117b. The evaporated refrigerant gas exiting heat exchangers coils 117a and 117b is then passed back to the suction side of compressors 121a and 121b by way of lines 124a and 124b. The refrigeration systems of FIG. 6 can be regulated by well-known refrigeration control devices. While a dual compression refrigeration system is disclosed as the cooling means for the treated distiller grain in FIG. 6 a single compression refrigeration cycle system could also be used to provide cooling refrigerant to a single cooling coil.

The cooling process has a significant impact on the physical properties of the final product. The amount of cooling is regulated to ideally produce a stable and cohesive final product which is discharged from the die extremity tubes 116. If insufficient cooling is applied during the cooling process, then the product exiting the die extremity tubes may possibly explode or over expand due to excessive pressure inside of the treated distiller grain. In certain situations as illustrated in FIG. 5, it may be necessary to apply different cooling rates to die extremity tubes 116a and 116b extending from the same compression enclosure 110b when the size and shape of the die extremity tubes are different or to produce two or more different final products having different properties. If excessive cooling is applied during the cooling process, this could result in an increase in friction between the die extremity inner wall and the treated distiller dried grain. As a result, this may increase the power required to push the finished product out of the die extremity tube. In the worst case scenario, the treated distiller dried grain may become lodged in the extruder die tube 116.

Figure 7A:
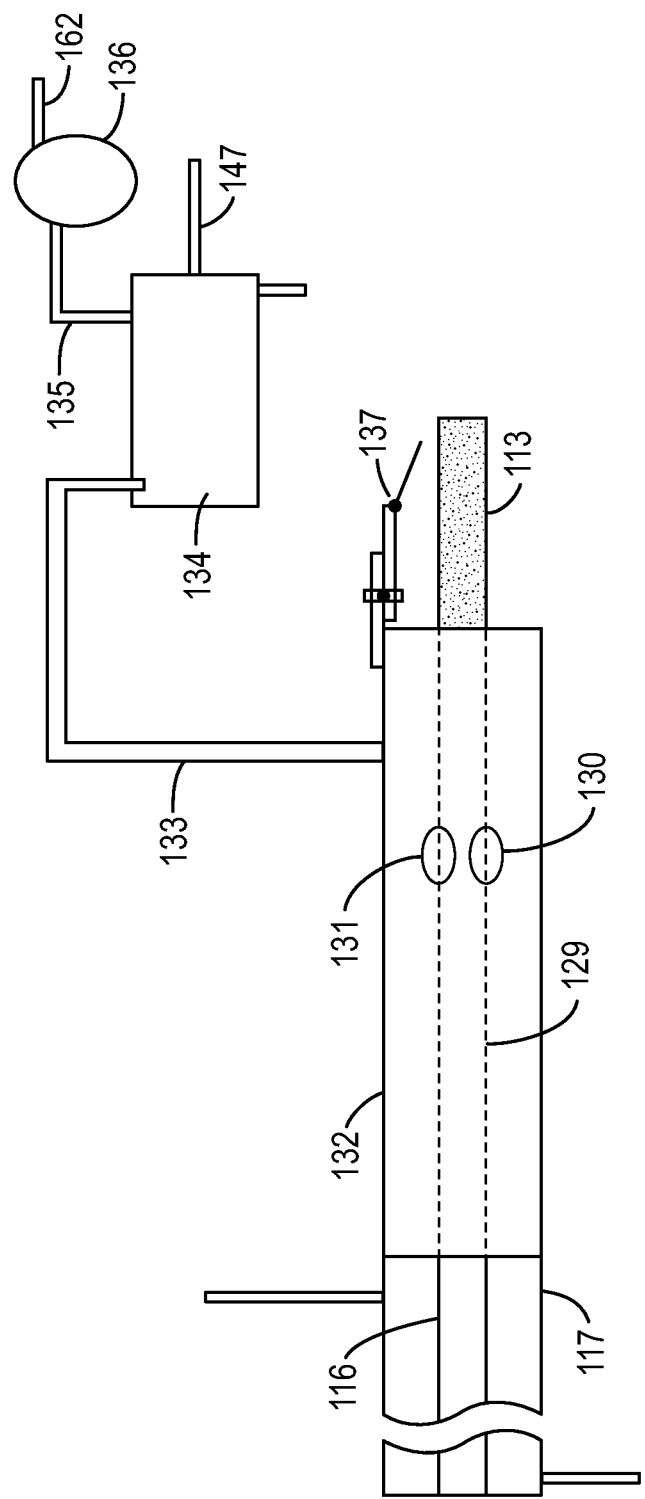
FIG. 7A shows the collection and vacuum system that extracts and collects oil from the extruded distiller grain exiting the cooling heat exchanger.
Figure 8:
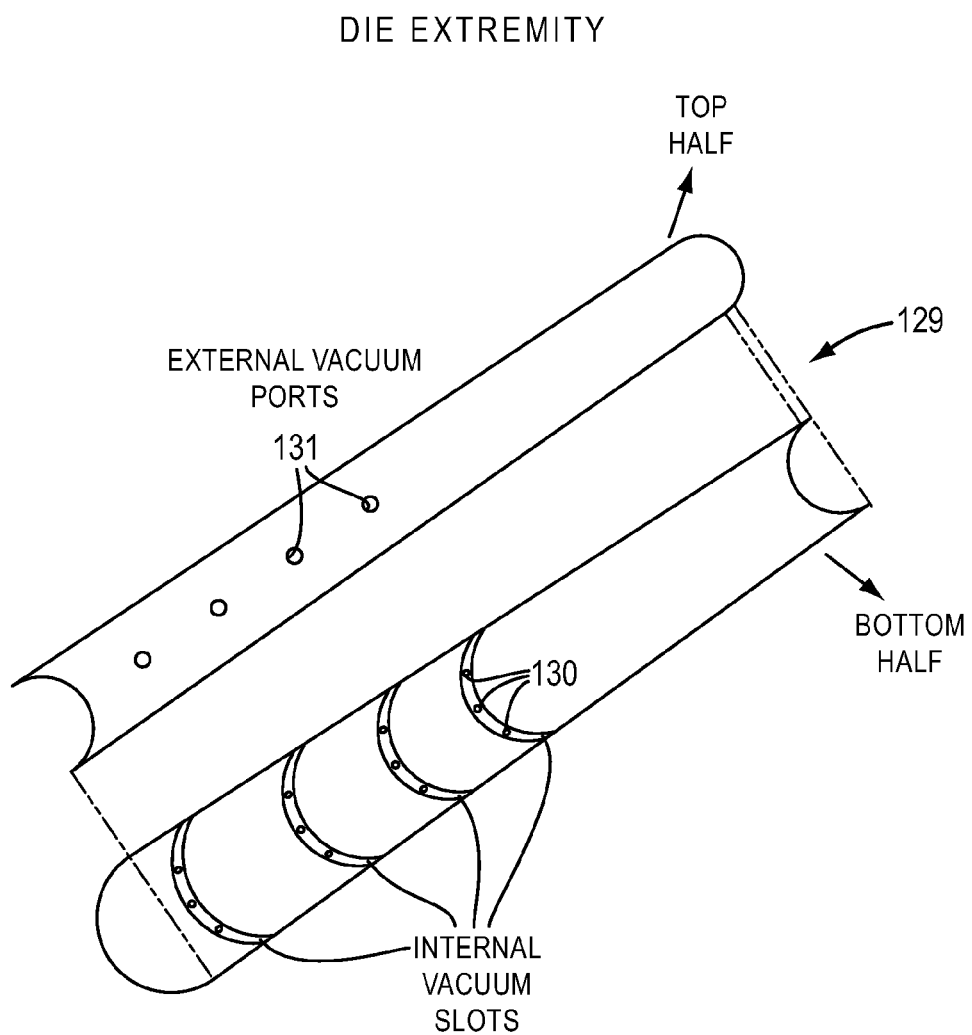
FIG. 8 shows details of the perforated die extremity that permits oil water and vapor to be vacuumed out of the treated distiller grain.

FIG. 7A shows an optional water/vapor and oil extraction and recovery system. In this arrangement, the extraction system is deployed at the end of the die extremity tube 116. The distiller grain exiting the die extremity tube 116 enters a perforated pipe 129 having perforations 130 that are arranged in slots around the lower portion of pipe 129. Perforations 131 are provided in the upper portion of pipe 129. Pipe 129 is surrounded by a tube 132 that includes a collection pipe 133 which in turn is connected to separating vessel 134. FIG. 8 shows further details of the perforations 130 and 131 in pipe 129. A pipe 135 is connected to the inlet of a vacuum pump 136 which discharges into pipe 162. When the vacuum pump is operated, a vacuum is created in the space between the inner wall of tube 132 and the openings 130 and 131 in the perforated pipe that are exposed to the surface treated distiller dried grain inside pipe 129. The vacuum acts to extract oil, water and/or vapor from the surface and the interior of the treated distiller grain through the openings 30, 31 as the treated material passes through inside pipe 129. The collected oil, water and/or vapor are then directed to the separator tank 134 by way of pipe 133. The separation tank 134 directs the collected oil, water and/or vapor through a path that separates the oil from the water within the separator tank. The oil is then drawn out of the separation tank to be used on site or to be shipped out to be processed into other products such as diesel fuel. The water may be collected and used on site or it may be discharged out of pipe 147.

Figure 7B:
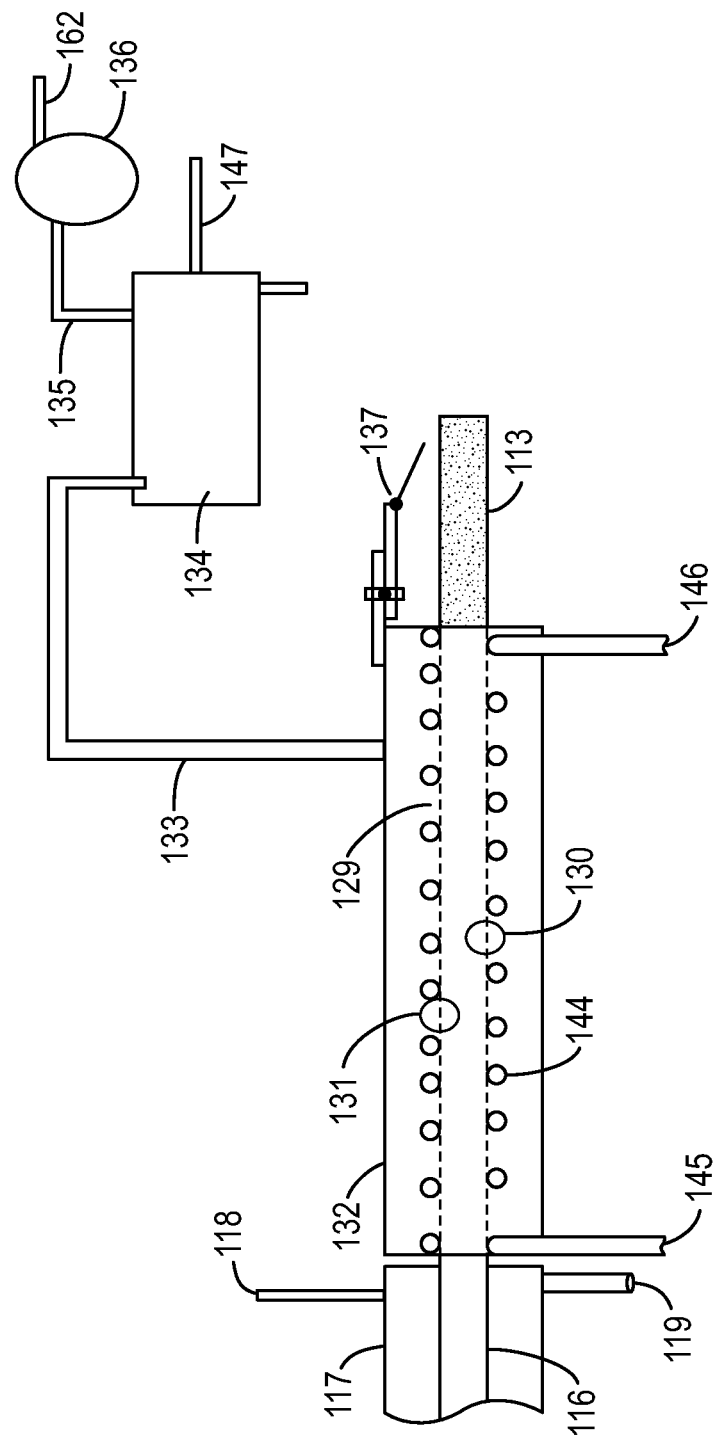
FIG. 7B shows an alternative embodiment of FIG. 7A where a cooling heat exchanger is mounted around a perforated die extremity.

An alternative embodiment of a water/vapor and oil extraction system is shown in FIG. 7B. This embodiment permits the possible application of two different cooling sources in the cooling process for the treated distiller grain. After the treated distiller grain is cooled in a preliminary heat exchanger 117, the treated distiller grain is directed to an additional heat exchanger arrangement in the form of a coil 144 that is wrapped around a perforated pipe 129 having perforations 130 and 131. The first heat exchanger 117 may be cooled, for example, by water and the second heat exchanger cooled by a compression vapor refrigeration system similar to that shown in FIG. 6. Other cooling sources may be applied to either heat exchanger 117 and 144 as desired. The heat exchanger 144 includes coolant inlets and outlets 145 and 146. The inlets and outlets 144 and 145 are interchangeable depending on the type of coolant flow desired. The perforations 130 and 131 are located between the coils 44 that form the heat exchanger. A tube 132 encloses the heat exchanger 144 and the perforated pipe 129. The perforations 130 and 131 are spaced such that they are not covered or obstructed by the heat exchanger coils 144. The space between the inside wall of pipe 132 and the perforations 130 and 131 in pipe 129 are subjected to a vacuum by way of pipe 133 that is connected to separating tank 134 and vacuum pump 136. In this particular embodiment, the vacuum created inside pipe 132 tends to draw the treated distiller dried grain against the inside wall of perforated pipe 129 to provide better heat transfer between the treated distiller grain and heat exchanger coils 144. If the treated distiller grain exiting the second die 115 in the compression enclosure 110 is sufficiently stable, the treated distiller grain may be simply pushed through the first heat exchanger 117 and the cooling process may be implemented in the second heat exchanger 144.

Figure 9A:
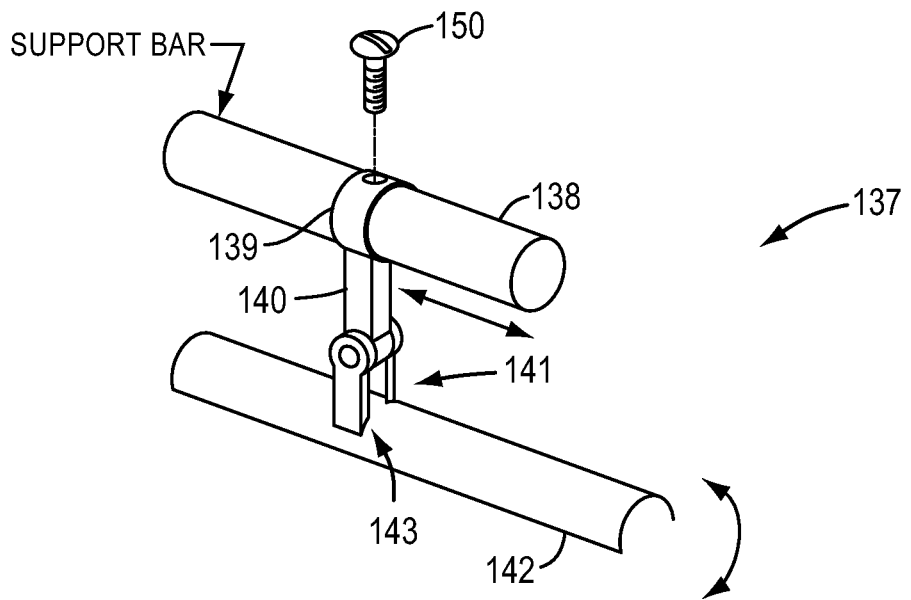
FIGS. 9A-9B show the device that adjusts the length of pellets exiting the die extremity.
Figure 9B:
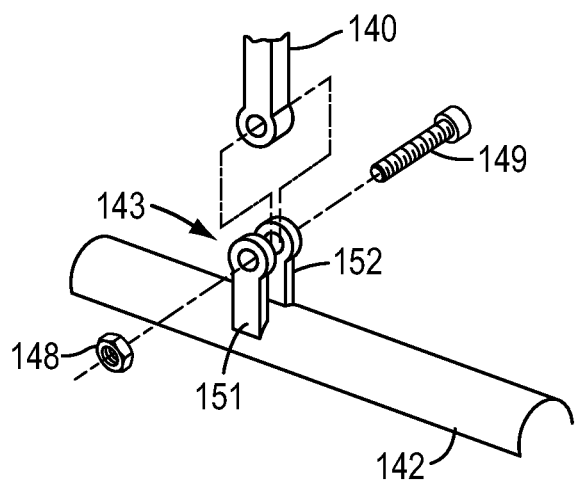

FIG. 9A shows a cutting device 137 that may be used after the cooling process to cut the treated material into pellets having a desired length. The pellets may also be referred to as range cubes. The cutting device 137 includes a mounting bar 138 a lateral adjustment clamp 139 that is connected to a connecting rod 40 which is pivotally connected at pivot 143 to the pellet length adjustment member 142. A locking bolt 150 screws into the top of clamp 139 to secure the lateral position of the connecting rod 140 on the support bar 138. The pivot point 143 shown in FIG. 9B comprises two spaced apart members 151 and 152 that receive connecting rod 140. Members 151, 152 and 140 are secured in a pivoting relationship by bolt 149 and lock nut 148. The pivot 143 may be in the form of a ball and socket or any other device that will permit adjustable pivotal motion between the connecting rod 140 and pellet length adjustment member 142. The support bar 138 can be mounted on the end of the die extremity tube 116 or other support member. In FIGS. 1, 7A, and 7B, this cutting device 137 is positioned above the exit point of device 100 such that it cuts the treated material into pellets, which may be collected into a container 160. By adjusting the lateral position of the pellet length adjuster 142 along the support bar 138 and also adjusting the angle of inclination of the pellet length adjuster 142 at pivot point 143, element 142 can be arranged to exert a selected degree of downward force on the treated distiller grain exiting the die extremity tube 116 which determines the length of the resulting pellets 113.

Figure 10:
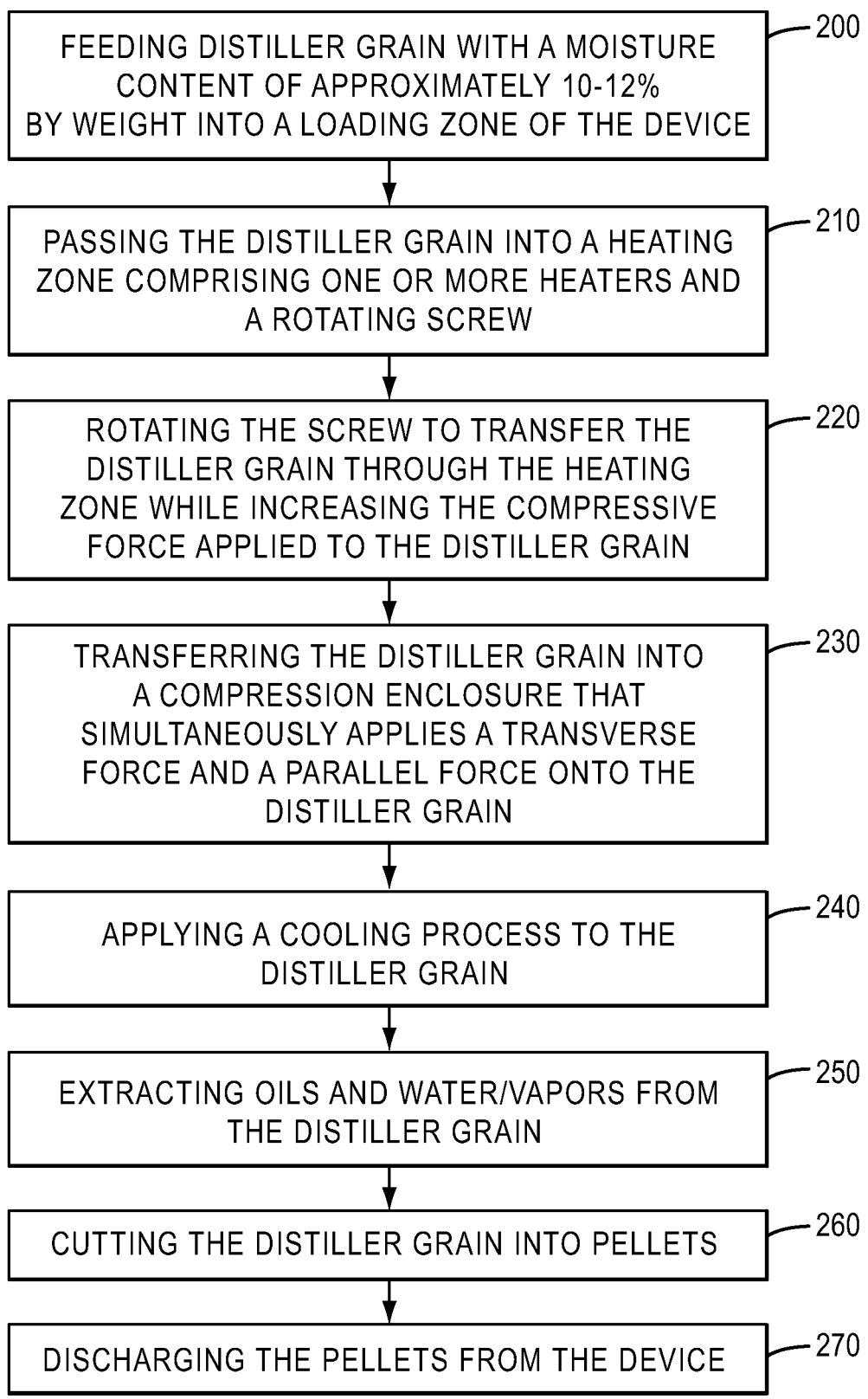
FIG. 10 illustrates an operational flow chart of a method of producing distiller grain pellets utilizing the device in accordance with the present teachings.

FIG. 10 illustrates an operational flow chart of a method for producing the distiller grain pellets utilizing the device in accordance with the present teachings. Dried corn distiller grain with a moisture content of about 10-12% by weight is feed into hopper at block 200. The dried corn distiller grain is passed into a heating zone comprising one or more heaters and a rotating screw as indicated in block 210. The dried corn distiller grain is gradually heated in by electrical heaters, for example, in five heating zones where the dried corn distiller grain is heated to about 140 degrees Fahrenheit by the time it arrives at the location designated as T5. Rotation of the screw transfers the dried corn distiller grain through the heating zone while simultaneously increasing the compressive force applied to the distiller grain as indicated at block 220. The dried corn distiller grain is transferred into a compression enclosure that simultaneously applies a transverse force and a parallel force onto the distiller grain as indicated at block 230. The dried corn distiller grain is pressed through the first die orifice 107. As the dried corn distiller grain is compressed and conveyed to the second die orifice 115 near a location designated as T6, its temperature has increased to approximately 180-200 degrees Fahrenheit. At this point oil and water in the treated corn distiller begins to boil and migrate toward the outer surface of the distiller grain and collects on the inner surface of compression enclosure 110 near the second die 115. Controlling the density of the treated material, the dried corn distiller grain begins to transform into a cohesive dense elastic material with the oil and water acting as a lubricating agent to assist in pressing the material through the ¾ inch second orifice 115. A cooling process is then applied to the distiller grain as indicated at block 240. After passing through the second orifice the transformed corn distiller grain enters water cooled heat exchange 116 where it is cooled to an internal temperature of less than 140 degrees Fahrenheit at a location designated as T8 before exiting as a dense durable and stable product, without the addition of binders and fillers. Optionally, oils, water, and vapors can be extracted from the distiller grain as it exits the cooling zone as indicated at block 250. The distiller grain can now be cut into nutritional pellets or cubes having a desired length or shape as indicated at block 260 and discharged from the device into a container as indicated at block 270.

In various embodiments, in addition to producing pellets/cubes, device 100 may be employed to produce a final product shaped as large tubs having distiller grains compressed therein. The farmers can put out the tubs and not have to feed pellets/cubes to the livestock every day. The tubs may weigh approximately 200 pounds and the density of the tubs limits the intake of the supplement to roughly 2-pounds of product per day, which allows the livestock eating the product to meet their daily requirements.

It will be apparent to those skilled in the art that various modifications and variations can be made to the pellet producing device and method of the present disclosure without departing from the scope of its teachings. In various embodiments, a wide variety of different kinds of pellets, cubes or tubs can be produced from various loose granular materials using substantially the same device since virtually unlimited numbers of shapes of the compression enclosure and one or more die extremity tubes can be designed and used to meet the requirements of a particular loose granular material. For example, the device may be used to compress feeding products such sorghum.

It should be noted that various embodiment of the device includes a controller that controls various sensors and components, such as pressure sensors, humidity sensors, temperature sensors, and drive controls, positioned in various locations throughout the device and connected in a computer control loop to set, maintain and control preselected conditions such as temperature, pressure, humidity, density, flow rate, and residence time in the treated material and/or components of the system.

Other embodiments of the disclosure will be apparent to those skilled in the art from consideration of the specification and practice of the invention disclosed herein. It is intended that the specification and examples be considered as exemplary only.

What is claimed is:

1. A method for producing a high density compact livestock feed from a granular material, the method comprising:

supplying the granular material to be treated;

advancing the treated material through a series of successive treatment zones comprising a heating zone, a compression zone, and a cooling zone using a controller in communication with a plurality of sensors included in the heating zone, the compression zone, and the cooling zone;

transferring the treated material into the heating zone, wherein the heating zone comprises at least one heater and at least one screw compression dryer:

the screw compression dryer comprising an elongated housing having an inlet end and a discharge end, the inlet end in communication with a source and to receive the granular material to be treated for drying;

a continuous rotatable screw provided within the elongated housing and extending between the inlet end and the discharge end, the screw has a diameter which increases in dimension in a direction away from the inlet end for increasing a compressive force applied to the treated material to assist with drying the treated material as the screw rotates and moves the treated material longitudinally along the screw;

a drive coupled to a profile screw for axially rotating said profile screw, wherein the drive is in communication with the controller to regulate a residence time of the treated material in the series of successive treatment zones; and the at least one heater disposed along the housing for heating the treated material moving along the screw to a first predetermined temperature which causes at least one liquid to boil within the treated material and changes physical properties of the treated material into a modulus state;

pressing the treated material through the compression zone comprising a compression device for compacting the treated material to form a high density compact body, wherein the compression device includes at least one through hole which extends longitudinally through the compression device and provides a passage for compressing the treated material, the through hole includes an inlet orifice for receiving the treated material from the heating zone and an outlet orifice for discharging the treated material to the cooling zone in the modulus state, wherein the inlet orifice includes a cross sectional area that is less than a cross sectional area defined by a circumference of an inside wall for the discharge end of the elongated housing, the treated material is pressed longitudinally through a compression chamber by simultaneously applying a lateral pressure and a two-dimensional cross-section compression which includes a first pressure applied in a direction traverse to a direction of transport and a second pressure applied in a direction parallel to the direction of transport, the controller controls the two-dimensional cross-section compression applied to the treated material such that the at least one liquids in the treated material migrates to an outer surface of the treated material upon reaching the outlet orifice; and transferring the high density compact body from the compression zone to the cooling zone comprising a cooling unit for cooling the high density compact body, wherein the cooling unit includes a die extremity tubing and a cooling device:

the cooling device having a cooling conduit provided between a cooling device inlet and a cooling device outlet; and the die extremity tubing comprises a first opening in direct communication with the outlet orifice for receiving the treated material from the compression zone and a second opening for discharging the treated material from the device as a high density livestock feed, the die extremity tubing extends through the cooling conduit such that the cooling device surrounds the die extremity tubing to cool the treated material using conductive heat transfer and the cooling device is controlled to cool the treated material to a second predetermined temperature which is below a boiling temperature of the at least one liquid within the treated material.

2. The method of claim 1, further comprising extracting the at least one liquid from the high density compact body, wherein the at least one liquid comprises at least one of oil, water, and vapor.

3. The method of claim 1, wherein the cooling device comprises at least one of a heat exchanger, a cryogenic cooler, a water chiller, and a cooling water.

4. The method of claim 1, wherein applying the lateral pressure and the two-dimensional cross-section compression pressures to produce the high density compact body depends upon a length of the compression device and an angle of inclination of a plurality of surface walls of the compression device.

5. The method of claim 1, wherein the compression device comprises a plurality of through holes.

6. The method of claim 5, wherein at least some of the plurality of through holes have differing configurations.

7. The method of claim 6, further comprising selecting a configuration of at least one through hole for pressing the treated material through based upon predetermined physical characteristics to be obtained in the high density compact body.

8. The method of claim 1, further comprising compressing the high density compact body to form at least one of a pellet, a cube, and a tub.

9. The method of claim 1, further comprising cutting the high density compact body to a predetermined length.

* * * * *